(No Model.)

J. A. BRILL.
BRAKE SUPPORT.

3 Sheets—Sheet 1.

No. 499,709.

Patented June 20, 1893.

Attest
C. W. Benjamin.
H. F. Durbur.

Inventor,
John A. Brill.
by Joseph L. Levy
atty (No Model.) 3 Sheets—Sheet 2.
J. A. BRILL.
BRAKE SUPPORT.
No. 499,709. Patented June 20, 1893.
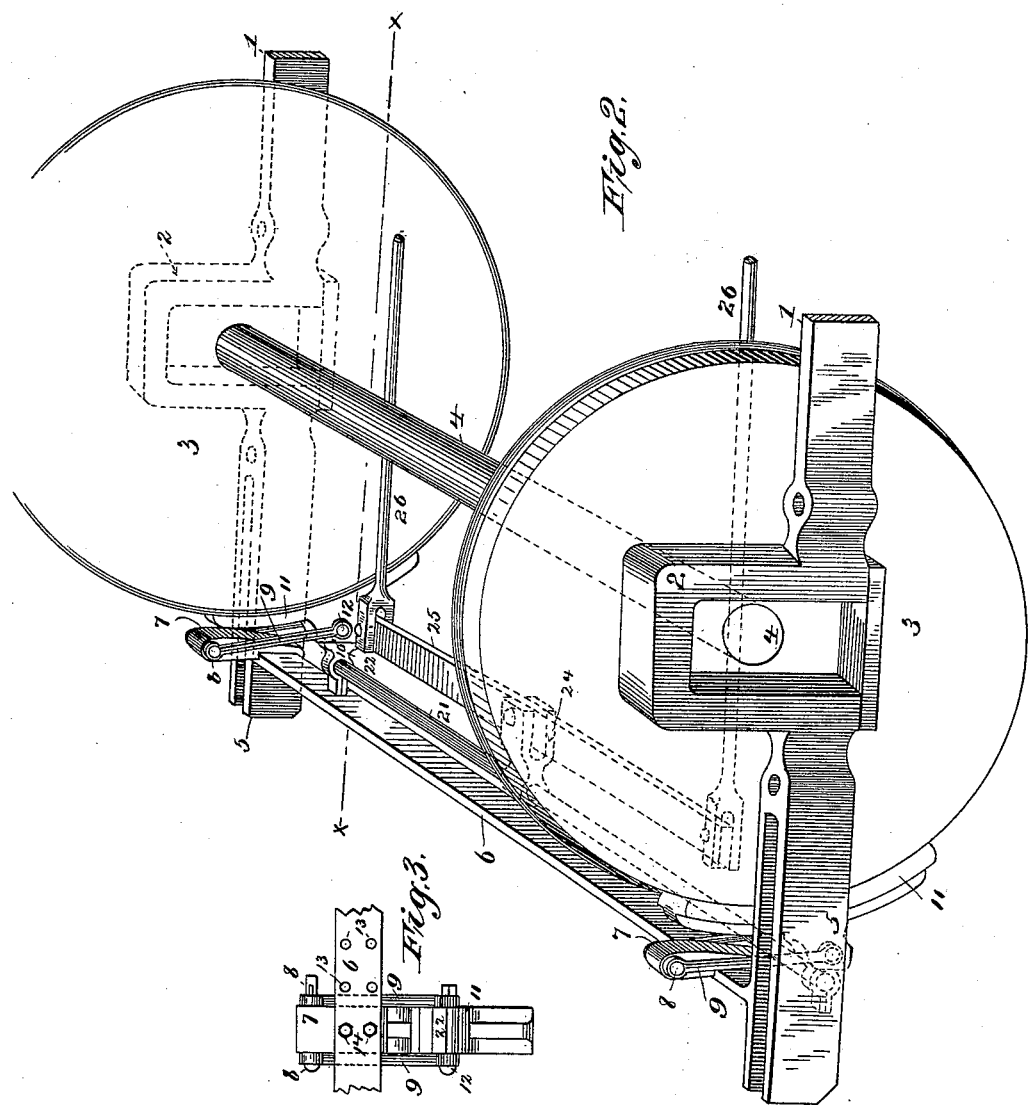
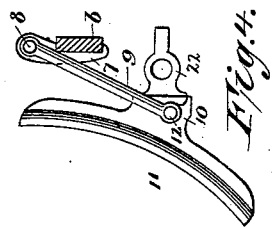
Attest:
C. W. Benjamin.
H. F. Durbin.
Inventor:
John A. Brill.
by Joseph L. Levy
atty (No Model.) 3 Sheets—Sheet 3.

J. A. BRILL.
BRAKE SUPPORT.

No. 499,709. Patented June 20, 1893.

Attest:
C. W. Benjamin
H. F. Durbur

Inventor:
John A. Brill
by
Joseph L. Levy
Atty

UNITED STATES PATENT OFFICE.

JOHN A. BRILL, OF PHILADELPHIA, PENNSYLVANIA.

BRAKE-SUPPORT.

SPECIFICATION forming part of Letters Patent No. 499,709, dated June 20, 1893.

Application filed November 21, 1892. Serial No. 452,684. (No model.)

*To all whom it may concern:*

Be it known that I, JOHN A. BRILL, a citizen of the United States, residing at Philadelphia, in the county of Philadelphia and State of Pennsylvania, have invented new and useful Improvements in Brake-Supports, of which the following is a specification.

My invention relates to devices for supporting the brake shoes of a car braking system in co-operative relationship with the bearing surfaces to which they are to be applied for the purpose of arresting the momentum of the car or train.

My invention consists in the device hereinafter described and pointed out in the claims.

Reference is had to the accompanying drawings, forming part of this specification, in which—

Figure 1:
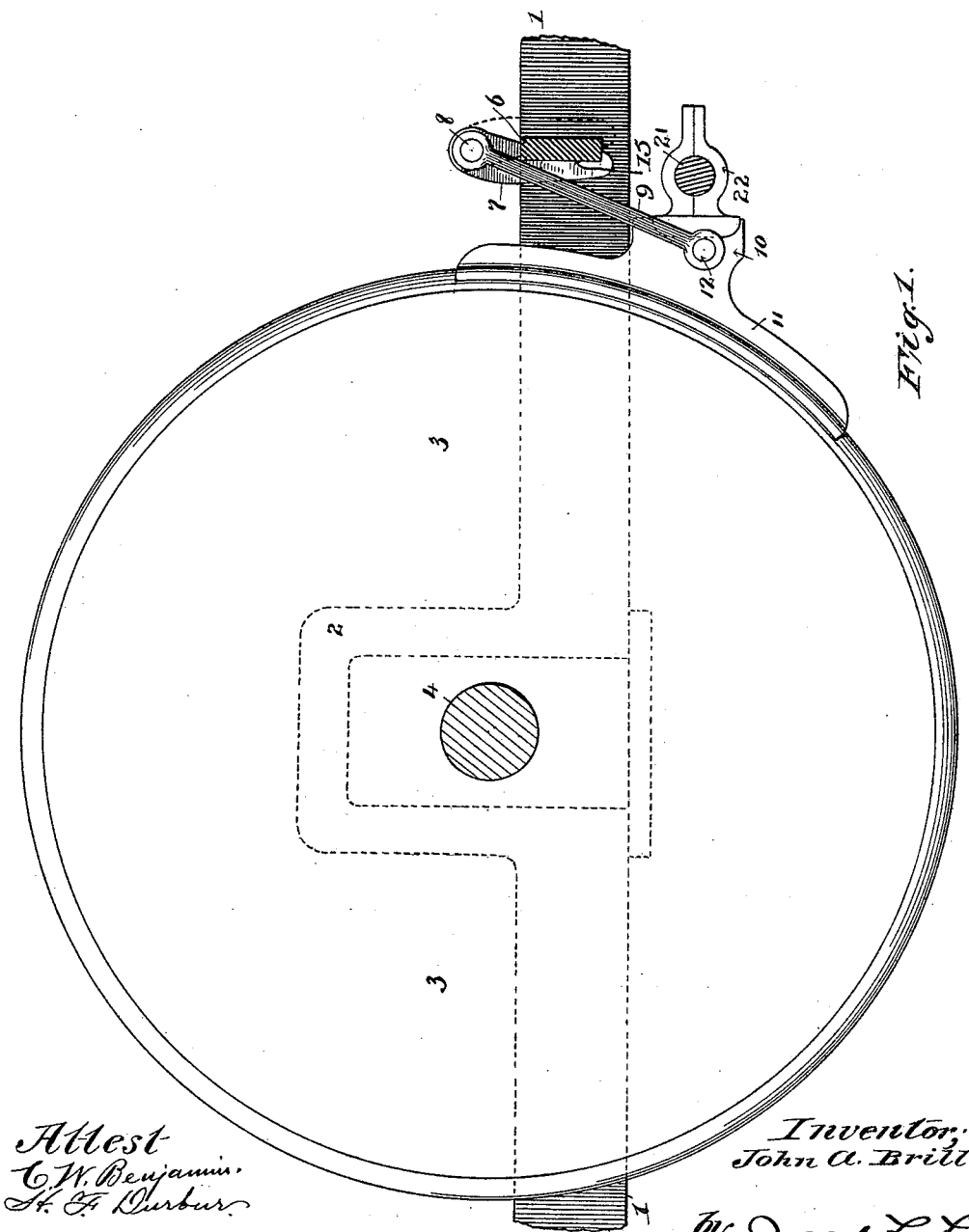
Figure 5:
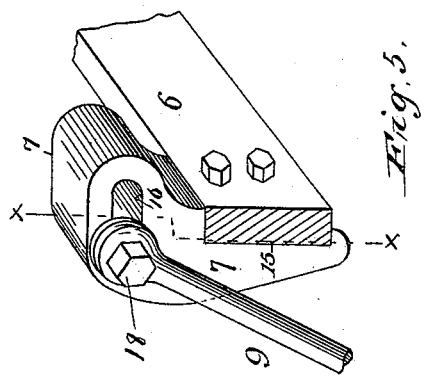

Figure 1 is an enlarged side elevation of a portion of a truck showing my brake support applied thereto, partly in section, taken on the line $x\ x$, Fig. 2; Fig. 2, a perspective view of one end of a truck showing the manner of applying my invention thereto; Fig. 3, a rear elevation of the support detached from the truck; and Fig. 4, a side elevation of the same; Fig. 5, a side elevation in perspective of a modified form of upright; and Fig. 6, a sectional elevation thereof on the line $x\ x$, Fig. 5.

Same numerals of reference refer to like parts throughout the several views.

For the purpose of description it is only necessary to show a part of a truck, and that shown in the drawings is provided with the side bars 1 of the axle box frame, so called, having the saddles 2, which straddle and form guides for the axle boxes (not shown) and the wheels 3 and axle 4. The axle box frame may be of the form shown in my application for Letters Patent, Serial No. 440,879, filed July 22, 1892, (to which cross reference is made) in which the side bars have a bifurcated extension 5 united transversely by a cross bar 6. For the purposes of this invention the cross bar can be separable from the side bars and bolted thereto, and the axle box frame can be of any preferred construction.

The axle box frame being mounted or suspended on the axle boxes, does not have the same amplitude of movement as does the car on its springs, and in some structures has none. In any of these cases the axle box frame is understood to be a part of a truck, independent in itself, so that anything fixed to the said axle box frame will be practically free from influence by and independent of the car body.

Adjacent to the tread or face of the wheels and to the cross bar 6 are secured uprights 7, which may be made to extend upwardly to any desired height, and which may either be apertured at the top for the passage of a pin 8 or be provided with trunnions for the same purpose. From each side of the upright (I will describe but one, both being similar) and from the pin 8, depend links 9, which take on to the boss 10 of the shoe 11, by means of the pin or bolt 12, the union being pivotal.

By reference to Fig. 3 it will be seen that the cross bar is provided with holes 13 by means of which the uprights are secured to the cross bar by bolts 14. The holes through which the securing bolts 14 pass are located adjacent to the tread or face of the wheel, and should it be desired to change the gage of the truck, the other bolt holes can be utilized for the purpose of securing the uprights in proper position in accordance with the change.

Instead of providing the cross bar with the holes 13 for the purpose of securing the upright in proper relation to the tread of the wheel, a clamp, or other analogous device can be used, the main idea being to secure the adjustability of the upright and shoe along the cross bar to meet changes in the gage as just before stated.

My invention is especially adapted for meeting the changes in the brake hanging made necessary by the substitution of wheels of a larger or smaller diameter. It very often occurs that the wheels of the truck are changed for those of larger or smaller diameter, and if to a larger diameter it would only be necessary to reverse the position of the uprights, and place the recess 15 against the outer side of the cross bar, as shown in dotted lines, Fig. 1.

Figure 6:
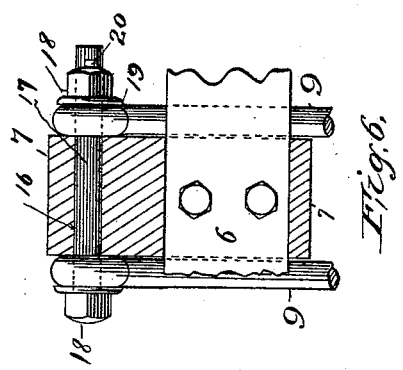

A modification of the uprights is shown in Figs. 5, 6, in which the upper part thereof is made larger and is provided with a slot 16, in which lies a short pin or spindle 17 capable of being moved from one end of the slot to the other, and secured in any position therein by means of the nuts 18, the spindle being screw threaded to receive them, and from the exposed ends of the spindle hang the links 9 which support the brake shoe 11. Washers 19 may be interposed between the links 9 and the nuts if desired. Instead of placing the links directly against the face of the uprights, the nuts 18 and washers can bear directly on the face of the upright, and the ends of the spindle can protrude out beyond and through the nuts, which ends can support the links, the nuts keeping the spindle in a set or fixed position, whereas in the drawings the spindle can have a slight movement if the nuts are not set home. The nuts and links can be held in place on either end of the spindle by cotters passing through the slot 20 therein.

From the foregoing it will be seen that the point of suspension of the links can be changed to meet the requirements due to the substitution of wheels of varying diameter, and that the requirements of such a change could be still easier met by a reversal of the location of the upright as before set forth.

Means for supporting the links, other than the spindle can be used without departing from the nature of my invention.

As my present invention relates solely to the support for the shoe, the particular kind of brake mechanism for applying the shoe to its appropriate bearing surface is immaterial; but a hereinafter described feature is useful. The one herein shown comprises the brake beam 21 which connects the two shoes by means of the apertured head 22 into which the ends of the beam pass, and to which it is secured, the head being fixed to the boss 10 of the shoe in any desirable way. The aperture in the head 22 is circular, and the brake beam 21 is cylindrical. This permits of the brake shoes being adjusted along the length of the beam to meet the change of gage as before set forth. To the brake beam is secured a jaw bolt 24 (in dotted lines, Fig. 2) between the jaws of which an equalizing bar 25 is secured, having at each end the brake rods 26. The brake mechanism is such as is shown in the patent to George M. Brill, No. 485,858, dated November 8, 1892, to which cross reference is made.

I do not limit myself to the use of two links as shown, as one may be used to support the shoe, nor to any particular form of brake operating mechanism, as various changes and modifications may be made in my invention without altering the nature thereof.

I claim—

1. The combination with the cross bar, of the upright detachably secured to the cross bar and adjustable thereon, the upright having pendent links and a brake shoe supported thereby, the adjustability of the upright providing means for accommodating the shoe to changes in the wheel gage, substantially as described.

2. The combination with the cross bar having a plurality of apertures, the uprights adapted to be adjusted along the cross bar, the pendent links and brake shoes, and a brake beam, the shoes being adjustable thereon, substantially as described.

3. The combination with the cross bar, of the upright 7, having the pendent link and brake shoe, and a recess 15 adapted to engage the cross bar, the means of suspending the links and the recess being so relationed as to enable the upright to be secured to either side of the cross bar and properly hang the shoe without changing the position of the link, substantially as described.

4. The combination with the cross bar, of the uprights 7 adjustable along said bar, the pendent links, the brake shoes, and a brake beam, the said shoes being adjustable along said beam, substantially as described.

5. The combination with the cross bar, of the upright, the brake shoe and the link, the link being adjustable in said upright, substantially as described.

6. The combination with the cross bar, of the upright, the brake shoe, the link, the link being adjustably supported on said upright, and means for securing said links in position, substantially as described.

7. The combination with the cross bar, of the uprights, means for adjustably securing them to the cross bar, the links pendent from the uprights and adjustable thereon, brake shoes on the links, a brake beam uniting the shoes, and a brake operating mechanism, substantially as described.

8. The combination with the cross bar, of the uprights, the pendent links, the brake shoes on the links, a brake beam, and operating mechanism, the union of the cross bar, uprights, links, shoes, and beam being adjustable in relation to each other, substantially as described.

9. The cross bar having the slotted upright, a pin or spindle movable in said slot, links depending from the pin, and a shoe on the links, substantially as described.

10. The upright having the longitudinally extending slot in the upper portion thereof, the movable spindle therein protruding without the slot, links depending from the spindle at each side of the upright, and a brake shoe on the links, substantially as described.

11. The cross bar, the upright 7 secured thereto, the slot 16 in the upright, the movable spindle in said slot extending out therefrom, nuts 18 on the spindle, and a brake shoe pendent from the spindle, substantially as described.

12. The combination with the cross-bar, of the reversible upright, adapted to be secured upon either side of the cross-bar, and support a link and brake shoe in proper relation to the tread of the wheel while in either position, substantially as described.

Signed at Philadelphia, in the county of Philadelphia and State of Pennsylvania, this 18th day of November, 1892.

JOHN A. BRILL.

Witnesses:
HENRY C. ESLING,
SYDNEY G. FISHER.